United States Patent
Britt et al.

(10) Patent No.: US 10,561,228 B2
(45) Date of Patent: Feb. 18, 2020

(54) PHONE GRIP ATTACHMENT

(71) Applicants: David Wayne Britt, Charlotte, NC (US); Deborah Laun, Skaneateles, NY (US); Robert Naas, Skaneateles, NY (US)

(72) Inventors: David Wayne Britt, Charlotte, NC (US); Deborah Laun, Skaneateles, NY (US); Robert Naas, Skaneateles, NY (US)

(73) Assignee: SECUREGRIP, LLC, Charlotte, NC (US)

( * ) Notice: Subject to any disclaimer, the term of this patent is extended or adjusted under 35 U.S.C. 154(b) by 39 days.

(21) Appl. No.: 15/923,629

(22) Filed: Mar. 16, 2018

(65) Prior Publication Data

US 2019/0281964 A1  Sep. 19, 2019

(51) Int. Cl.
A45F 5/10 (2006.01)
G06F 1/16 (2006.01)

(52) U.S. Cl.
CPC ........ *A45F 5/10* (2013.01); *A45F 2200/0516* (2013.01); *G06F 1/1613* (2013.01)

(58) Field of Classification Search
CPC ...... A45F 5/10; A45F 5/102; A45F 2005/108; A45F 2005/1013; A45F 2200/0516; H04M 1/02; H04B 1/3888; G06F 1/1626; G06F 2200/1633; G06F 1/1613
USPC ...... 16/406, 407, 411, 422, 426, 114.1, 405; 224/218, 217
See application file for complete search history.

(56) References Cited

U.S. PATENT DOCUMENTS

| 3,572,870 | A | * | 3/1971 | Marks | A45C 13/22 |
| | | | | | 312/244 |
| 5,938,137 | A | | 7/1999 | Poulson | |
| 6,546,103 | B1 | | 4/2003 | Wong | |
| 7,661,567 | B2 | | 2/2010 | Myers | |
| 7,665,684 | B2 | | 2/2010 | Salentine et al. | |
| 8,251,210 | B2 | | 8/2012 | Schmidt et al. | |
| 8,297,440 | B2 | | 10/2012 | Schmidt et al. | |

(Continued)

FOREIGN PATENT DOCUMENTS

| GB | 2515397 | 9/2015 |
| JP | 3430078 | 5/2003 |

(Continued)

OTHER PUBLICATIONS

CES 2015: Beeline shows off iPhone 6 case w/retractable kevlar cord for the outdoors, 49 Magazine, 2015, retrieved from www.49magazine.com/archives/10749, 3 pgs. 2015.

(Continued)

*Primary Examiner* — Emily M Morgan
(74) *Attorney, Agent, or Firm* — Bryan Cave Leighton Paisner LLP

(57) ABSTRACT

A phone grip attachment includes a base configured for attachment to a phone and a finger-hold attached to the base. The finger-hold has a top member and a bottom member. The finger-hold is movable between an extended position in which an opening is defined between the top member and the bottom member for use in gripping the phone and a collapsed position in which the top member is substantially flat against the bottom member. The finger-hold can be biased to the extended position. The finger-hold can be rotatably attached to the base.

20 Claims, 16 Drawing Sheets

(56) References Cited

U.S. PATENT DOCUMENTS

| | | | |
|---|---|---|---|
| D675,197 S | 1/2013 | Losiewicz | |
| 8,371,486 B2 | 2/2013 | Imafuku et al. | |
| D679,271 S | 4/2013 | Liu | |
| 8,408,513 B2 | 4/2013 | Smith | |
| 8,411,849 B1 | 4/2013 | McKenzie et al. | |
| D685,778 S | 7/2013 | Fahrendorff et al. | |
| D686,199 S | 7/2013 | Fahrendorff et al. | |
| 8,528,798 B2 | 9/2013 | Chen | |
| 8,550,317 B2 | 10/2013 | Hyseni | |
| 8,567,832 B2 | 10/2013 | Kannaka | |
| 8,577,412 B1 | 11/2013 | Bishop | |
| 8,678,255 B2 | 3/2014 | Zhang et al. | |
| D703,647 S | 4/2014 | Kim | |
| 8,737,066 B1 | 5/2014 | Block | |
| D706,254 S | 6/2014 | Chang | |
| 8,746,448 B1 | 6/2014 | Bellace | |
| 8,794,560 B2 | 8/2014 | Salentine et al. | |
| 8,915,409 B2 | 12/2014 | Smith | |
| 8,950,638 B2 | 2/2015 | Wangercyn et al. | |
| 9,072,363 B2 | 7/2015 | Paugh et al. | |
| 9,104,377 B2 | 8/2015 | Rekuc et al. | |
| 9,155,377 B2 | 10/2015 | Wangercyn et al. | |
| 9,179,762 B2 | 11/2015 | Paugh | |
| 9,210,977 B2 | 12/2015 | Lach et al. | |
| 9,261,912 B2 | 2/2016 | Bell | |
| 9,300,346 B2 | 3/2016 | Hirsh | |
| 9,312,905 B2 | 4/2016 | Ehrlich | |
| D756,980 S | 5/2016 | Beeman | |
| 9,369,168 B2 | 6/2016 | Molnar | |
| 9,386,832 B2 | 7/2016 | Elgan | |
| D763,239 S | 8/2016 | Chan et al. | |
| D765,069 S | 8/2016 | Jeffrey | |
| 9,407,743 B1 | 8/2016 | Hershberg | |
| D766,225 S | 9/2016 | Williams | |
| 9,469,499 B1 | 10/2016 | Chen | |
| 9,473,608 B1 | 10/2016 | Sherman et al. | |
| D771,028 S | 11/2016 | Kim | |
| D771,608 S | 11/2016 | Kim et al. | |
| 9,496,911 B2 | 11/2016 | Brand | |
| D774,500 S | 12/2016 | Reese | |
| 9,521,896 B2 | 12/2016 | Peterson | |
| D775,619 S | 1/2017 | Tien | |
| D776,104 S | 1/2017 | Tien | |
| D777,154 S | 1/2017 | McGowan et al. | |
| 9,538,833 B2 | 1/2017 | Rowley | |
| 9,545,146 B1 | 1/2017 | King | |
| 9,545,147 B2 | 1/2017 | King | |
| D778,275 S | 2/2017 | Gabriel et al. | |
| D780,166 S | 2/2017 | Gabriel et al. | |
| D780,167 S | 2/2017 | Tien | |
| 9,581,291 B2 | 2/2017 | Trotsky | |
| 9,590,685 B1 | 3/2017 | Yehuda | |
| 2005/0011982 A1 | 1/2005 | Salentine et al. | |
| 2005/0072819 A1 | 4/2005 | Maldonado et al. | |
| 2007/0278265 A1 | 12/2007 | Contente | |
| 2008/0227419 A1 | 9/2008 | Traub | |
| 2011/0084081 A1 | 4/2011 | Chung | |
| 2011/0266316 A1 | 11/2011 | Ghalib | |
| 2011/0267748 A1* | 11/2011 | Lane | A45F 5/00 361/679.01 |
| 2011/0297581 A1* | 12/2011 | Angel | F16M 13/04 206/736 |
| 2011/0309117 A1 | 12/2011 | Roberts | |
| 2012/0025039 A1 | 2/2012 | Segal | |
| 2012/0025684 A1 | 2/2012 | Trotsky | |
| 2012/0031937 A1 | 2/2012 | Baker | |
| 2012/0043452 A1 | 2/2012 | Karmatz | |
| 2012/0048873 A1* | 3/2012 | Hyseni | A45F 5/00 220/752 |
| 2012/0063066 A1 | 3/2012 | Floit | |
| 2012/0111881 A1 | 5/2012 | Gaddis | |
| 2012/0113572 A1 | 5/2012 | Gaddis | |
| 2012/0187706 A1 | 7/2012 | Kannaka | |
| 2012/0267402 A1 | 10/2012 | Beatty | |
| 2012/0299318 A1* | 11/2012 | Murphy | A45F 5/00 294/25 |
| 2012/0329534 A1* | 12/2012 | Barnett | F16M 11/10 455/575.8 |
| 2013/0214022 A1 | 8/2013 | Harvey | |
| 2013/0240380 A1 | 9/2013 | Hansen | |
| 2013/0240580 A1 | 9/2013 | Yu | |
| 2014/0078653 A1* | 3/2014 | Chiang | G06F 1/1656 361/679.01 |
| 2014/0117177 A1 | 5/2014 | Shamsadov | |
| 2014/0148313 A1 | 5/2014 | Orlando | |
| 2014/0152034 A1 | 6/2014 | Tussy | |
| 2014/0217135 A1* | 8/2014 | Murphy | A45F 5/00 224/218 |
| 2014/0364176 A1 | 12/2014 | Pintor | |
| 2015/0076183 A1 | 3/2015 | Palma | |
| 2015/0097008 A1 | 4/2015 | Adeyemi | |
| 2015/0122852 A1* | 5/2015 | Feng | A45F 5/00 224/191 |
| 2015/0157116 A1 | 6/2015 | Williams | |
| 2015/0201743 A1 | 7/2015 | Erickson-Davis et al. | |
| 2015/0289634 A1 | 10/2015 | Chavez | |
| 2015/0305480 A1 | 10/2015 | Brousseau | |
| 2015/0331448 A1 | 11/2015 | Truong et al. | |
| 2015/0335138 A1 | 11/2015 | Juarbe | |
| 2016/0028428 A1* | 1/2016 | Sturniolo | H04B 1/3888 455/575.8 |
| 2016/0088924 A1* | 3/2016 | Haymond | A45F 5/00 224/218 |
| 2016/0094262 A1 | 3/2016 | Chroney | |
| 2016/0249718 A1 | 9/2016 | Oh et al. | |
| 2016/0345715 A1* | 12/2016 | Lin | A45F 5/00 |
| 2017/0000250 A1* | 1/2017 | Carnevali | A45F 5/10 |
| 2017/0055660 A1 | 3/2017 | Tien | |
| 2018/0302114 A1* | 10/2018 | Nielsen | A45F 5/10 |
| 2019/0141174 A1* | 5/2019 | Britt | H04B 1/385 |

FOREIGN PATENT DOCUMENTS

| | | |
|---|---|---|
| JP | 2013165823 | 8/2013 |
| JP | 2014023141 | 2/2014 |
| KR | 101765766 | 8/2017 |
| WO | 2016019256 | 2/2016 |
| WO | 2016081362 | 5/2016 |
| WO | 2016166607 | 10/2016 |

OTHER PUBLICATIONS

Foldable selfie stick case for iPhone 7 retractable PC Silicone Mobile Phone Bluetooth Remote Control Coque for iPhone 7plus, retrieved Mar. 10, 2017 from www.pinterest.com/pin/67525853784854239/, 3 pgs. 2017.

Case iPhone Retractable Selfie Stick Apple iPhone 6, iPhone 6 Plus, iPhone 6s, iPhone 6s Plus, retrieved Mar. 10, 2017 from www.casefanatic.com/store/ 2017.

Patent Cooperation Treaty, International Search Report for PCT/US2019/013793, 3pgs. Apr. 23, 2019.

Discount Retractable Covers, 2017 Retractable Car Covers on sale at DHgate, retrieved from www.dhgate.com/discount/retractable-covers-on-sale.html 2017.

Chua, M., Reelcase—IPhone case with retractable lanyard marks sure your phone is always by your side, retrieved from mikeshouts.com/reelcase-iphone-case-with-retractable-lanyard/ 2015.

Patent Cooperation Treaty, International Search Report for PCT/US2019/022751, 3 pages Jun. 28, 2019.

* cited by examiner

PHONE GRIP ATTACHMENT

FIELD

The present disclosure generally relates to phone attachments, and more particularly to apparatuses and methods related to phone grip attachments having a finger-hold.

BACKGROUND

Mobile phones and handheld devices are in widespread use. The devices are often expensive, leading users to purchase protective phone cases or grips to prevent damage to the phones due to dropping. It can be difficult for users to maintain their grip on the phone during activities such as texting, browsing, and taking pictures or selfies. Furthermore, phones and the phone screens can be utilized in different orientations, depending on the desired use and the preferences of the user.

SUMMARY

Among the various aspects of the present disclosure is the provision of a phone grip attachment having a finger-hold as substantially shown and described.

Briefly, therefore, one aspect of the disclosure is directed to a phone grip attachment comprising a base configured for attachment to a phone. A finger-hold is attached to the base. The finger-hold has a top member and a bottom member, and is movable between an extended position in which an opening is defined between the top member and the bottom member for use in gripping the phone and a collapsed position in which the top member is substantially flat against the bottom member in which the top member is substantially flat against the bottom member.

Another aspect of the disclosure is directed to a phone grip attachment comprising a base configured for attachment to a phone. The base includes a top surface, a bottom surface, and at least one locking portion. The bottom surface includes a recessed portion. The at least one locking portion comprises an overhang defining a gap between the locking portion and the top surface of the base. Adhesive is positioned in the recessed portion of the bottom surface for securing the base to a phone. A finger-hold is attached to the base, the finger-hold having a top member and a bottom member. The finger-hold is movable between an extended position in which an opening is defined between the top member and the bottom member for use in gripping the phone and a collapsed position in which the top member is substantially flat against the bottom member. The finger-hold is biased to the extended position. The locking portion is configured to engage the finger-hold to retain the finger-hold in the collapsed position.

Another aspect of the disclosure is directed to a method comprising providing a phone grip attachment including a base configured for attachment to a phone. The base includes a top surface, a bottom surface, and at least one locking portion. The bottom surface includes a recessed portion, and the at least one locking portion comprises an overhang defining a gap between the locking portion and the top surface of the base. Adhesive is positioned in the recessed portion of the bottom surface for securing the base to a phone. A finger-hold is attached to the base, the finger-hold having a top member and a bottom member. The finger-hold is movable between an extended position in which an opening is defined between the top member and the bottom member for use in gripping the phone and a collapsed position in which the top member is substantially flat against the bottom member. The finger-hold is biased to the extended position. The locking portion is configured to engage the finger-hold to retain the finger-hold in the collapsed position. The method includes securing the phone grip attachment to a phone using the adhesive. The method further includes and collapsing the finger-hold from the extended position to the collapsed position by pressing the top member substantially flat against the bottom member and rotating the finger-hold until at least one tab of the finger-hold is positioned in the gap defined by the overhang.

Other objects and features will be in part apparent and in part pointed out hereinafter.

BRIEF DESCRIPTION OF THE DRAWINGS

These and other features, aspects and advantages of the disclosure will become more fully apparent from the following detailed description, appended claims, and accompanying drawings, wherein the drawings illustrate features in accordance with exemplary aspects of the disclosure, and wherein:

Like reference numerals indicate corresponding parts throughout the several views of the drawings.

DETAILED DESCRIPTION

The accompanying Figures and this description depict and describe aspects of apparatuses and methods in accordance with the present disclosure, and features and components thereof. It should also be noted that any references herein to front and back, right and left, top and bottom and upper and lower and the like are intended for convenience of description, not to limit the present invention or its components to any one positional or spatial orientation.

Before any aspects of the disclosure are explained in detail, it will be understood that the disclosure is not limited in its application to the details of construction and the arrangement of components set forth in the following description or illustrated in the following drawings. The disclosure is capable of other aspects and of being practiced or of being carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. All numbers expressing measurements and so forth used in the specification and claims are to be understood as being modified in all instances by the term "about."

Figure 1:
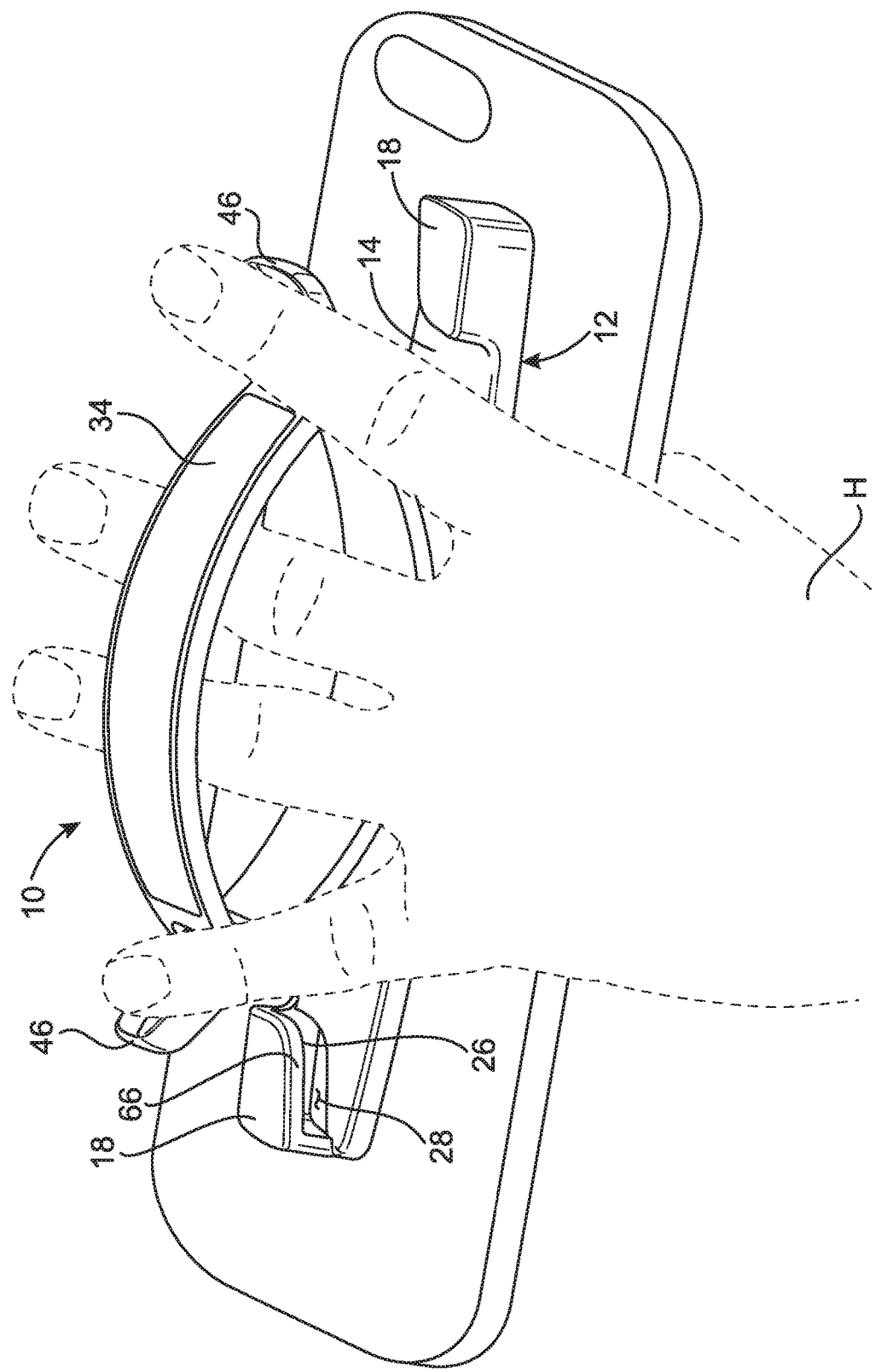
FIG. 1 is a perspective view of a phone grip attachment secured to a phone, illustrating a user's hand using the finger-hold.
Figure 6:
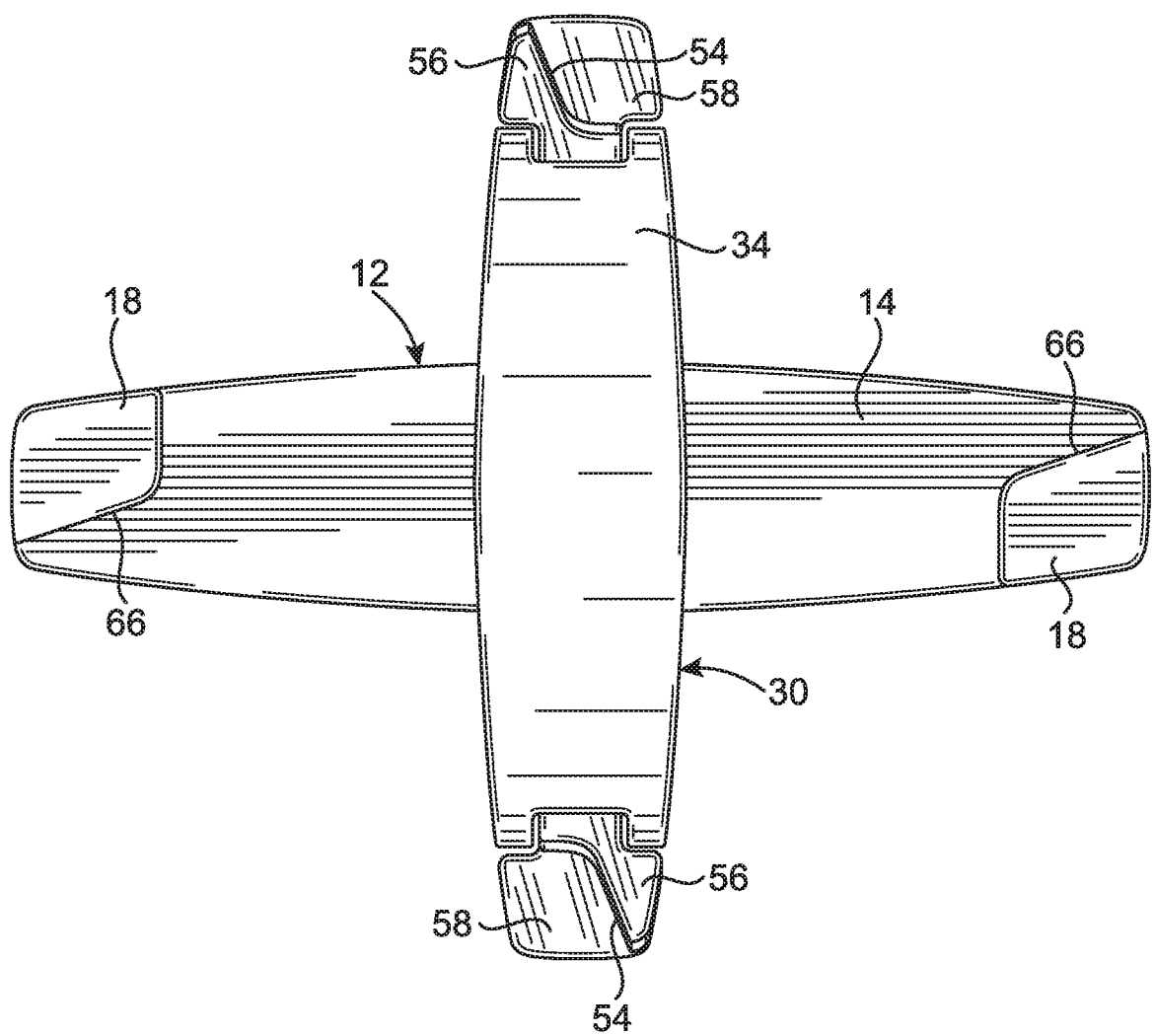
FIG. 6 is a top plan of the phone grip attachment of FIG. 2, illustrating the finger-hold in a second extended position rotated from the first extended position illustrated in FIG. 5.
Figure 7:
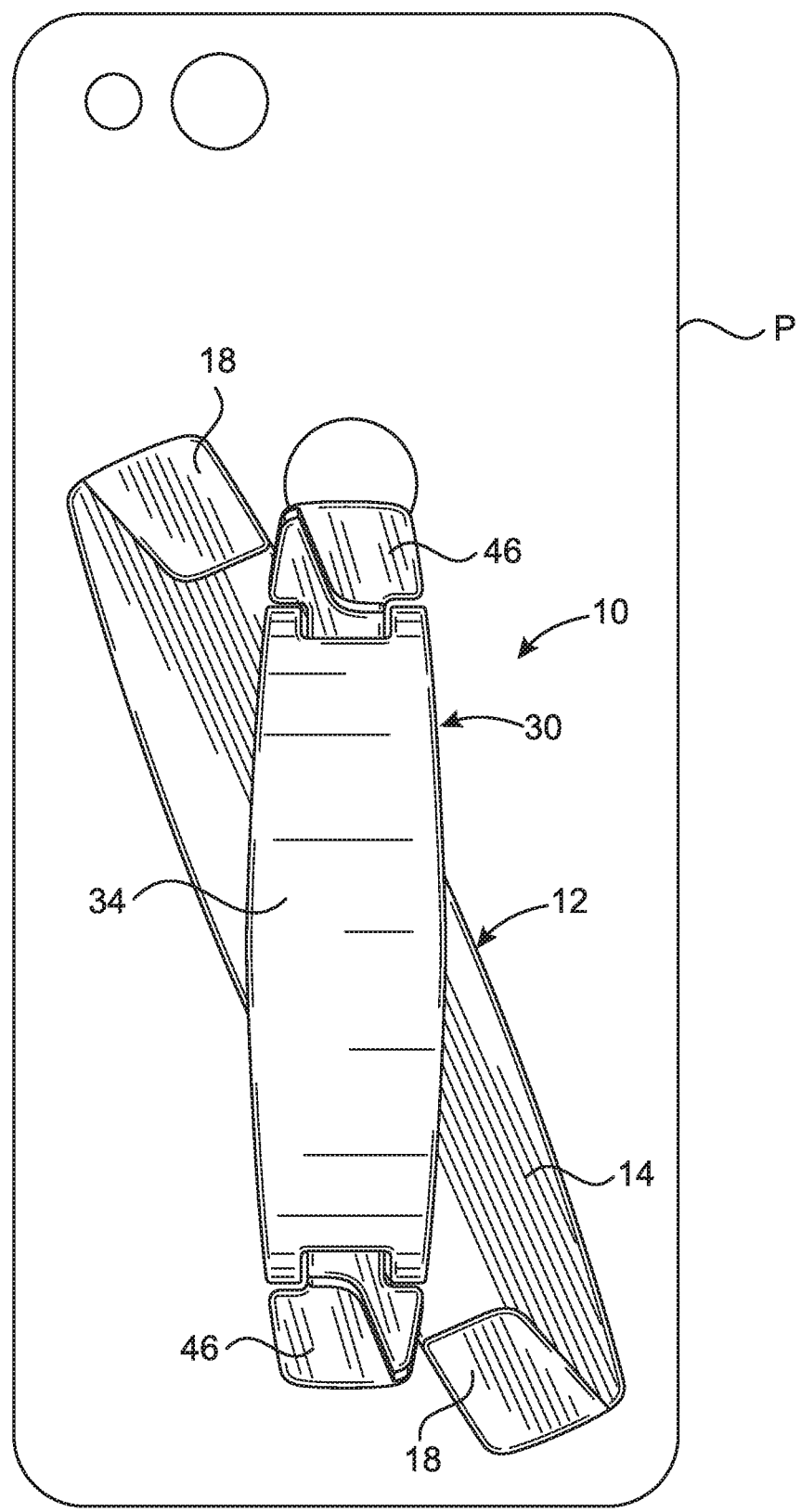
FIG. 7 is a top plan of the phone grip attachment secured to a phone in a second orientation, illustrating the finger-hold in a third extended position rotated from both the first and second extended positions.
Figure 8:
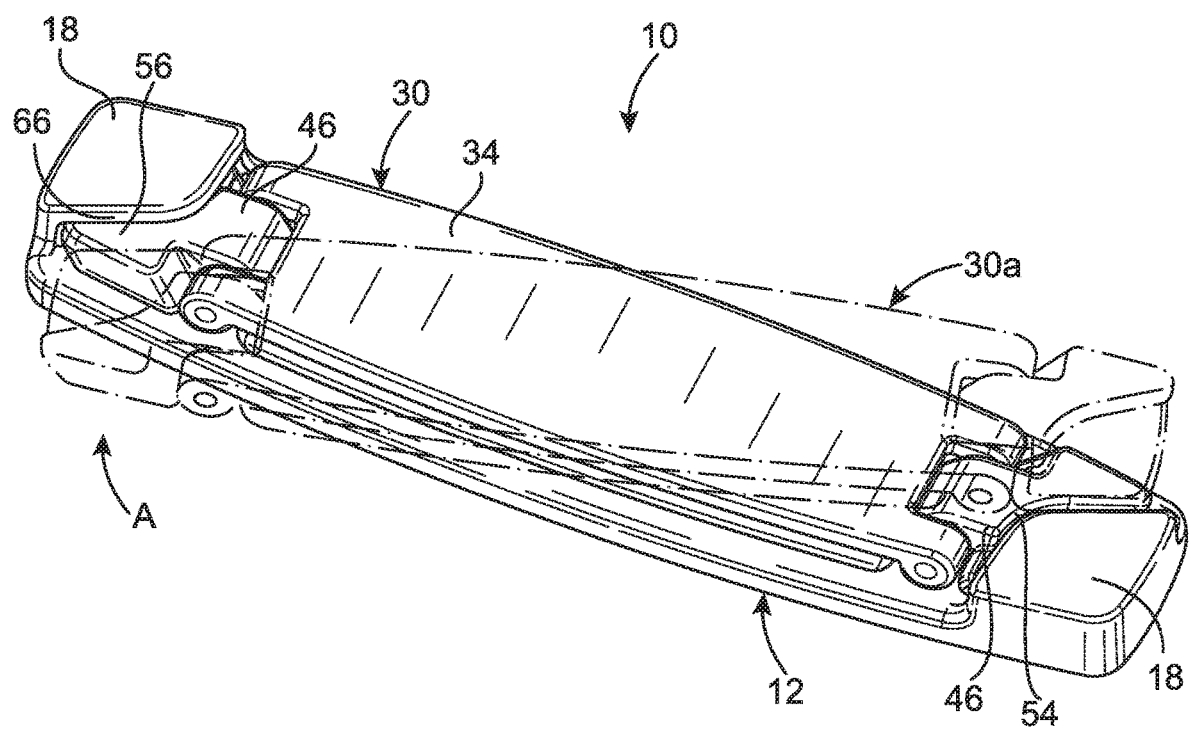
FIG. 8 is a perspective of the phone grip attachment, illustrating the finger-hold in a collapsed position and showing movement of the collapsed finger-hold to the locked position.

Referring to FIGS. 1-9, a phone grip (broadly, an attachment) is shown generally at 10. The attachment 10 includes a base 12 having an upper or top surface 14 and a lower or bottom surface 16 opposite the top surface. The base 12 includes at least one locking portion 18, as described in further detail below. The attachment 10 is generally rectangular, although other configurations are within the scope of the present invention. As seen in FIGS. 1 and 7, the attachment 10 is configured, sized, and dimensioned for attachment to the back of a phone or handheld device P (e.g., phones and handheld devices sold by Apple, Inc., Samsung Group and Samsung Electronics, Google LLC, etc.) in order to assist a user in maintaining the user's grip on the phone or handheld device P. As such, the attachment 10 can be positioned on the back of the phone or handheld device P in any orientation so as to avoid interfering with any components of the phone (e.g., camera opening, speaker opening, volume button openings or demarcations, etc.). The attachment can also be sized to permit attachment to different handheld devices. In one embodiment, the attachment 10 is so sized, configured, and dimensioned to enable attachment to any handheld device without interfering with functional components of the handheld device. The attachment 10 can be made of any suitable plastic, rubber, metal, or any other material suitable for use in gripping a phone. The attachment 10 may be molded or formed as one piece, or may be constructed of separate components that are attached together.

Figure 3:
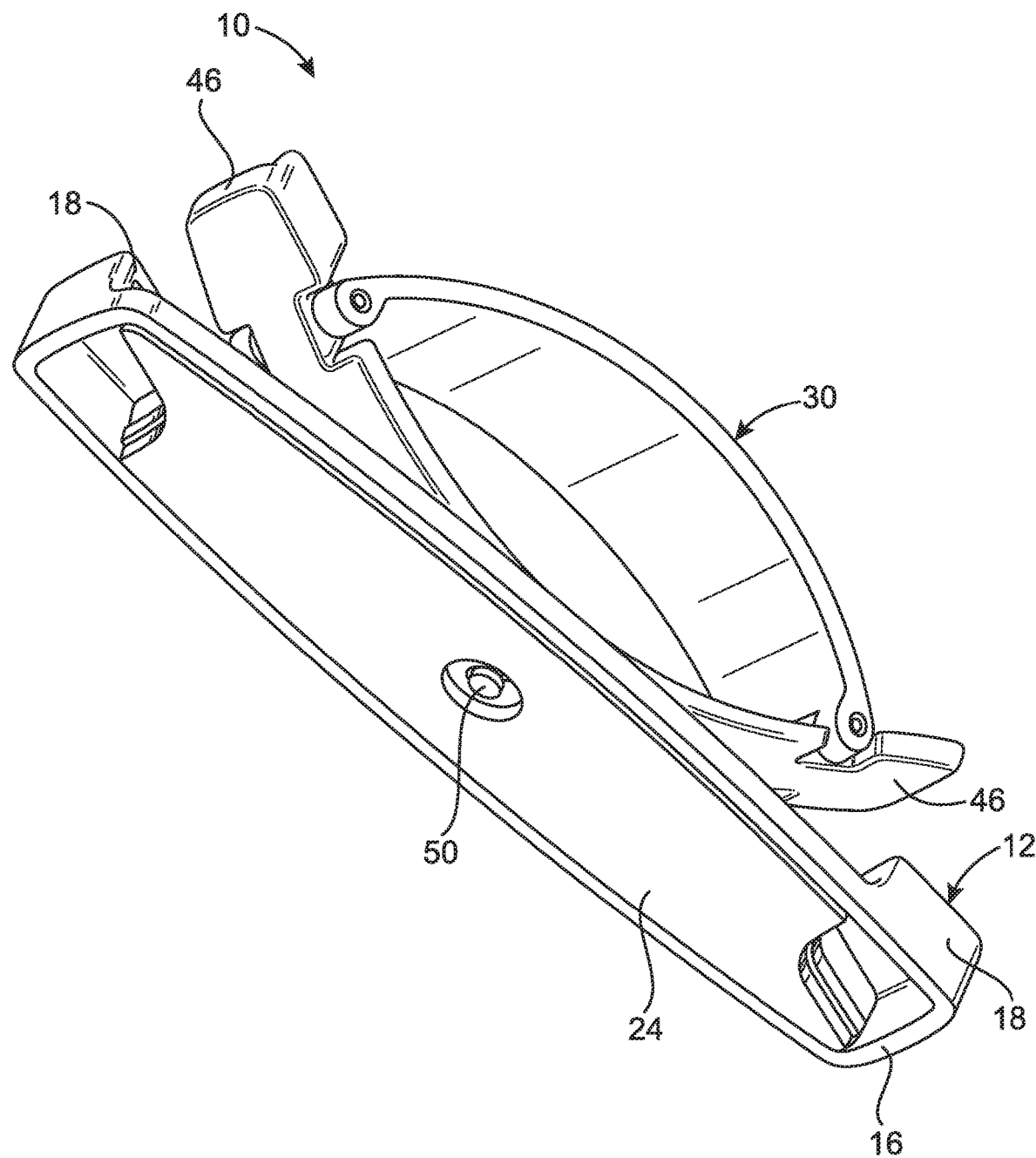
FIG. 3 is a bottom perspective view of the phone grip attachment illustrating the finger-hold in the first extended position.
Figure 9:
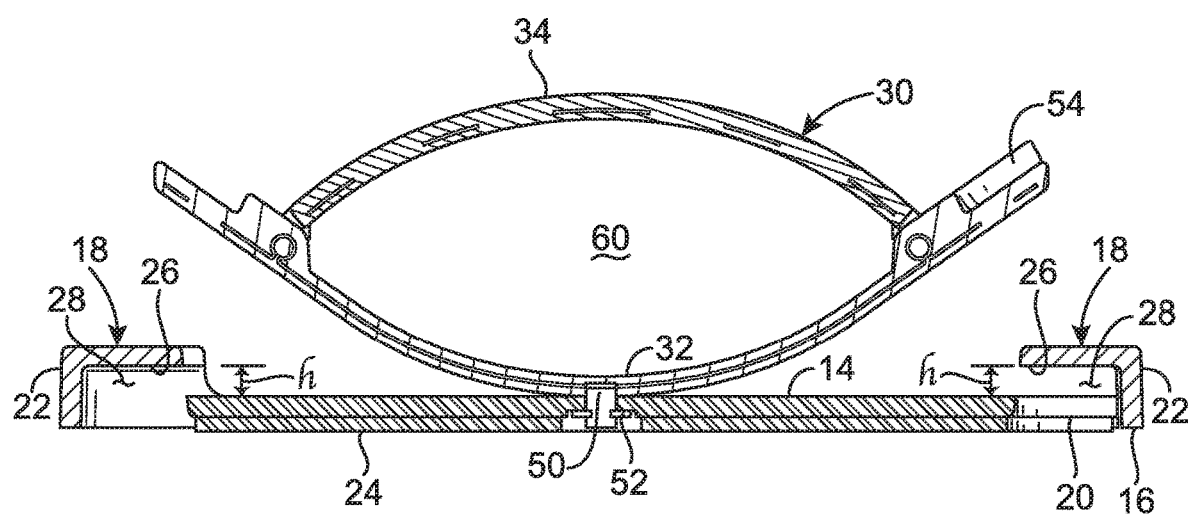
FIG. 9 is a section of the phone grip attachment of FIG. 2.

Referring to FIGS. 3 and 9, in one embodiment the bottom surface 16 of the attachment 10 includes a recessed portion 20. The recessed portion 20 is recessed from the outer perimeter of the bottom surface 16. In one embodiment, the recessed portion 20 can be a portion of the attachment that is cut away or molded to be recessed. Alternatively, the recessed portion 20 can comprise a separate insert that is positioned inside a wall or perimeter 22 of the attachment 10. Other configurations of the recessed portion are within the scope of the present invention. As seen in FIGS. 3 and 9, the recessed portion 20 is configured to receive adhesive for attaching the phone grip 10 to a phone P. In the illustrated embodiment, adhesive 24 comprises foam tape (e.g. double-sided foam tape), although other attachment structures are within the scope of the present invention. The foam tape 24 is configured to secure the attachment 10 to a handheld device P. As illustrated, the tape 24 can be configured, sized, and dimensioned to fit within the recessed portion 20 on the bottom surface 16 of the attachment 10, and can include geometrically corresponding features to the bottom surface (e.g., cutouts at either end and in the center).

Referring to FIGS. 1-9, the base includes at least one locking portion 18. In the embodiment illustrated in FIGS. 1-9, the base 12 includes two locking portions 18. The locking portions 18 are at diagonally opposed positions of the base 12. Other configurations (e.g., centered locking portion(s) (see, e.g., FIGS. 14 and 15), fewer than two locking portions, more than two locking portions) are within the scope of the present invention. Each locking portion 18 includes an overhang or ledge 26 positioned above the remainder of the base 12. In the illustrated embodiment, the base 12 includes cutouts below each overhang 26 (e.g., for ease of manufacturing), although these can be omitted within the scope of the present invention. Each overhang 26 is positioned above the top surface 14 of the base 12 so as to define a gap 28 having a height h. The locking portions 18 are sized, positioned, and configured to receive and engage a finger-hold of the attachment 10, as described in more detail below.

Referring still to FIGS. 1-9, the attachment 10 includes a finger-hold 30 positioned on the base 12 of the attachment. The finger-hold 30 is movable between a collapsed position (see, e.g., FIG. 8) and an extended position (see, e.g., FIG. 2). In the extended position, the finger-hold 30 can be grasped by a user for secure gripping of the attachment 10 (and the phone secured thereto), as described in more detail below.

Figure 4:
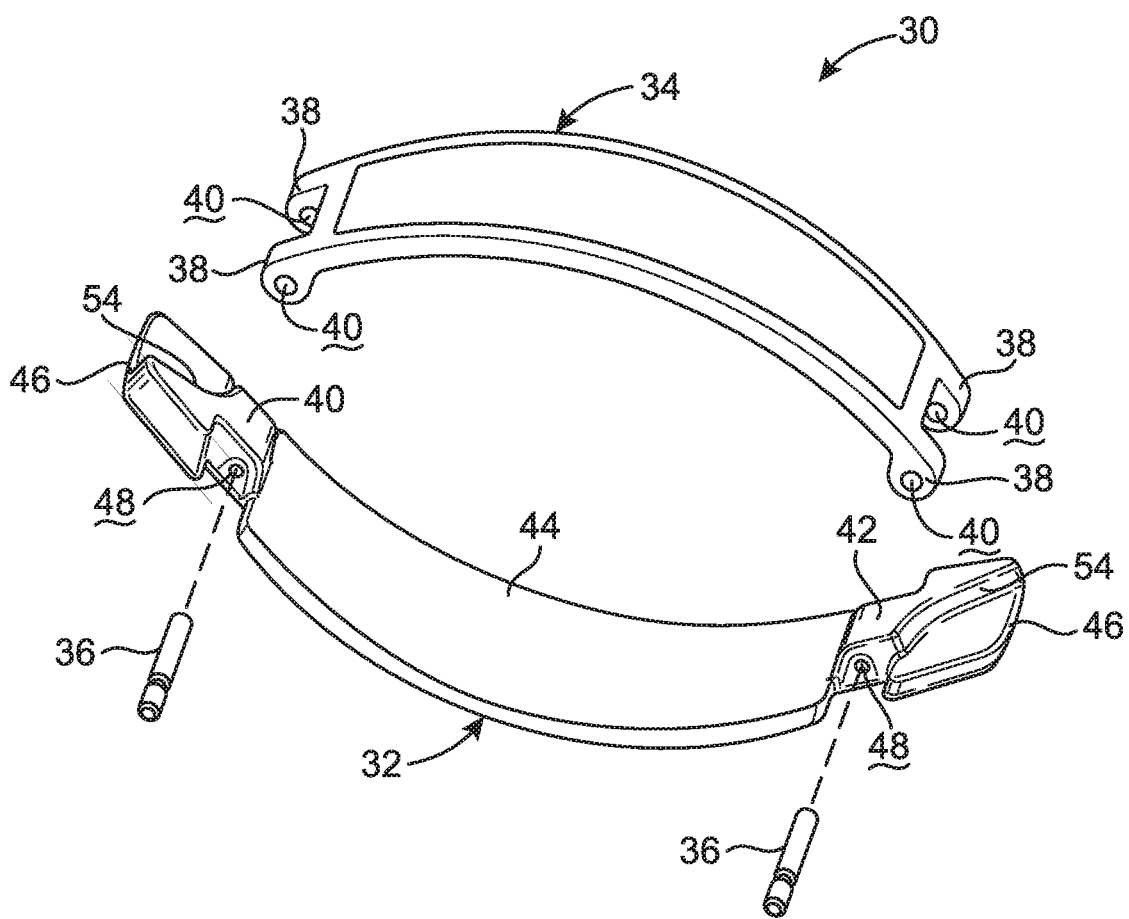
FIG. 4 is a separated view of the finger-hold.
Figure 5:
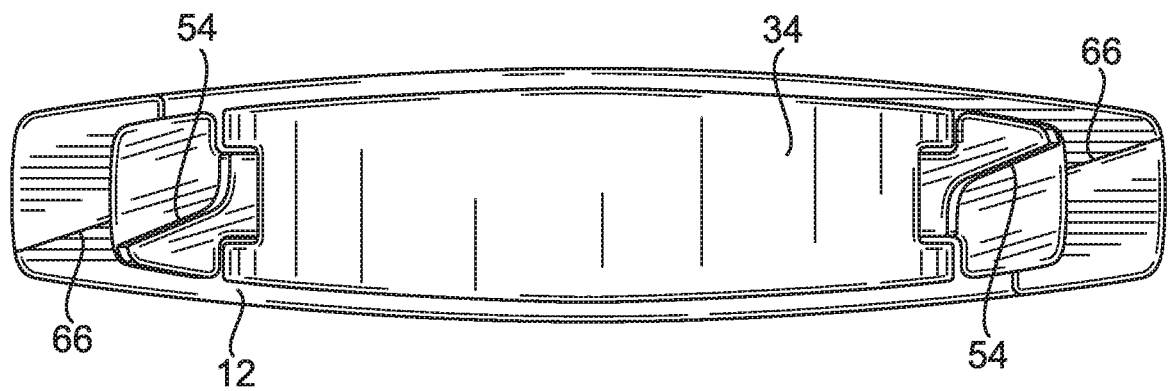
FIG. 5 is a top plan of the phone grip attachment of FIG. 2, illustrating the finger-hold in the first extended position.

Referring to FIG. 4, the finger-hold 30 includes a bottom member 32 and a top member 34. In the embodiment illustrated in FIGS. 1-9, the top and bottom members 34, 32 are generally curved when the finger-hold 30 is in the extended position. Other configurations are within the scope of the present invention, such as planar, angled, or multi-component top and bottom members. The bottom and top members 32, 34 are movably (e.g., pivotally) attached to each other. As illustrated, in one embodiment the top and bottom members 34, 32 are pivotally attached by pins 36. The top member 34 includes a spaced pair of ears 38 at each end thereof, each of the ears including an opening 40. The bottom member 32 includes a neck 42 near each end, separating a central portion 44 of the bottom member from tabs 46 at each end of the bottom member. Each of the tabs 46 can optionally include a contoured edge or stop 54 corresponding to the shape of a free edge of the locking portion 18. The necks 42 of the bottom member 32 each include an opening 48. When the finger-hold 30 is assembled such that the top and bottom members 34, 32 are pivotally attached, the neck 42 on a first end of the bottom member 32 is positioned between the pair of ears 38 on a first end of the top member 32, and the neck 42 on a second end of the bottom member is positioned between the pair of ears 38 on a second end of the top member. The top member 34 is pivotally attached to each end of the bottom member 32 by a pin 36 extending through the neck 42 of the bottom member and the pair of ears 38 of the top member at each respective end. Other configurations are within the scope of the present invention. For example, the top member can include necks that are positioned between pairs of ears on the bottom member. In other embodiments, any suitable pivot attachment between members can be used.

The finger-hold 30 is movably attached to the base 12. In the illustrated embodiment, the finger-hold 30 is attached to the base 12 so as to permit free rotational movement in either direction (i.e., counterclockwise and clockwise). In an illustrated embodiment, the finger-hold is attached to the base 12 of the attachment 10. For example, as illustrated, fastener 50 attaches the base 12 to the bottom member 32 of the finger-hold 30. Fastener 50 can be any suitable fastener configured to permit free rotation of the finger-hold 30 relative to the base 12. In one embodiment, fastener 50 comprises a rivet. In one embodiment, as illustrated, the fastener 50 does not extend completely through the bottom member 32 of the finger-hold 30; in other words, in one embodiment the fastener is not visible and a user does not contact the fastener 50 when using the finger-hold 30. Optionally, a retaining ring 52 may be positioned on fastener 50 against the lower surface 16 of the attachment 10. In one embodiment, the bottom surface 16 includes a central portion that is not recessed (e.g., is coplanar with the perimeter of the bottom surface) and extends beyond the fastener 50 to prevent the fastener from contacting the back of a phone P secured to the attachment 10. It is understood that any attachment permitting rotation of the finger-hold 30 relative to the base 12 is within the scope of the present invention. Although free rotation of the finger-hold when it is in the extended position is shown and described, other configurations are within the scope of the present invention, such as a limited arc of movement for the finger-hold, or other suitable attachments.

The finger-hold 30 is movable between an extended position and a collapsed position. In the extended position (see, e.g., FIG. 2), an opening 60 is defined between the bottom member 32 and the top member 34 of the finger-hold 30. In the collapsed configuration (see, e.g., FIG. 4), the top member 34 lies substantially flat against the bottom member 32. Thus, in the extended position, the finger-hold is configured to be grasped by a user to securely hold the attachment and phone. For example, as seen in FIG. 1, a user may insert one or more fingers through the opening 60 to securely attach the phone to the user's hand H. A user may also rest one or more fingers on one or both of the tabs 46 of the bottom member 32, to provide a secure and comfortable hold. As described above, the finger-hold can be attached to the base 12 to permit free rotation relative thereto. Thus, a user can position the finger-hold 30 in any desired orientation relative to base 12 (and therefore relative to the phone P) for secure holding based on comfort, orientation of phone screen during use, or any other factor. Use of the finger-hold 30 permits secure holding of the phone while leaving the user's thumb free for use of the phone. In the collapsed position, the finger-hold is configured to lie substantially flat against the base 12, so as to be out of the way of the user or to reduce the footprint of the attachment (and therefore of the assembly including the phone) for storage (e.g., carrying in a pocket, placing on a surface, etc.).

Figure 2:
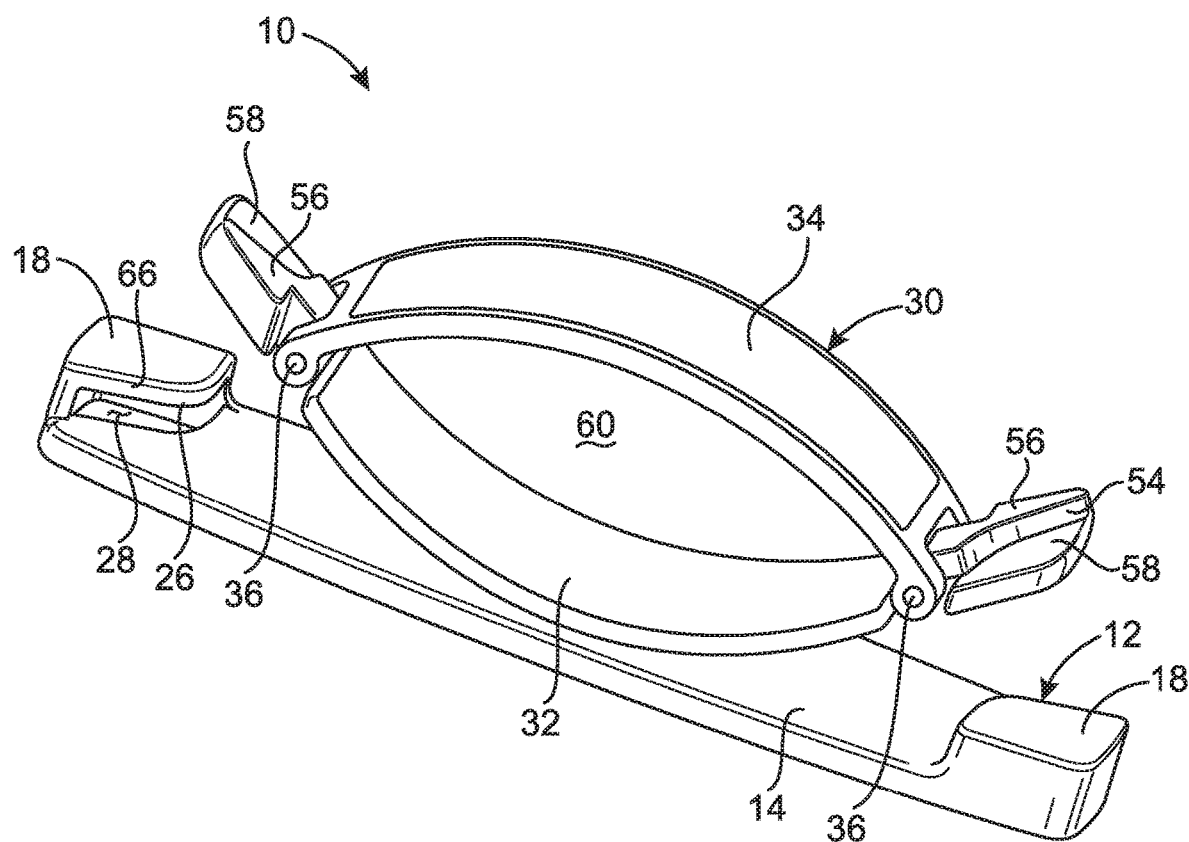
FIG. 2 is a perspective view of the phone grip attachment illustrating a finger-hold in a first extended position.

The finger-hold 30 is preferably biased to the extended position. Thus, absent external forces acting on the finger-hold 30, the finger-hold is in the extended position for grasping by a user. The finger-hold may include spring steel, shape memory alloy, or any other suitable material or configuration to permit biasing to the extended position (see, e.g., FIG. 9). In order to overcome the bias and collapse the finger-hold, the locking portion 18 engages the finger-hold. For example, the finger-hold is rotated such that a portion of the finger-hold is positioned underneath the overhang 26. In the embodiment illustrated in FIGS. 1-9, the tabs 46 of the bottom portion 32 are rotated to a position underneath the overhangs 26 (i.e., in the gaps 28), although other configurations are within the scope of the present invention (e.g., a different portion of the finger-hold being positioned under the overhang to retain the finger-hold in the collapsed position). Each tab 46 is thus positioned between the base 12 and the respective overhang 26. Each tab 46 may contact an underside of the respective overhang 26. The overhang thereby prevents the finger-hold 30 from returning to the extended position, and maintains the finger-hold in the collapsed position. In order to move the finger-hold to the collapsed position, in one embodiment the finger-hold can be pressed down (e.g., by pressing down on the top member 34 to flatten the finger-hold). Once the finger-hold 30 is sufficiently flattened to fit underneath the overhangs 26 (see, e.g., position of finger-hold 30a in FIG. 8), the finger-hold is rotated (e.g., in direction of arrow A in FIG. 8) to move the tabs 46 under the respective overhangs 26. The overhangs 26 thereby contact the tabs 46 to prevent the finger-hold from returning to the extended position, maintaining the finger-hold in the collapsed position. In the illustrated embodiment, each tab includes a contoured edge or stop 54. As shown in FIGS. 2, 4, and 6, the stop 54 comprises an edge between an upper portion 56 and a lower portion 58 of the tab 46 (alternatively, a first or lower portion 58 having a first thickness and a second or upper portion 56 having a second thickness greater than the first thickness). When the finger-hold 30 is rotated to the locked position, the lower portion 58 is positioned in the gap 28 beneath the overhang 26. The upper portion 56 is positioned adjacent the locking portion 18, and preferably has a top surface coplanar with a top surface of the locking portion. The stop or contoured edge 54 engages a free edge 66 of the locking portion 18 to prevent further movement of the finger-hold 30 (i.e., to prevent further movement of the tab 46 under the overhang 26). It is understood that the stop may be omitted or the tabs 46 have only one thickness within the scope of the present invention. In order to move the finger-hold 30 from the collapsed position back to the extended position, the finger-hold is rotated to remove the tabs 46 from under the overhangs 26. With nothing to counteract the bias and force the finger-hold to remain collapsed, the finger-hold will return to the extended position.

As illustrated, the attachment 10 may optionally include additional features to facilitate easy use and gripping by a user. For example, one or both of the top and bottom members 34, 32 of the finger-hold can include ribbed gripping surfaces (see, e.g., FIG. 10). The finger-hold 30 can be coated in rubber or other plastic material for easy gripping. It is understood that other ribbed portions or designs, and other gripping surfaces, are within the scope of the present invention, and that the attachment need not include any additional features to facilitate easy gripping (see, e.g., FIG. 2, with no ribbed surfaces).

FIGS. 10-17 illustrate alternative configurations for the attachment 10. Unless otherwise stated, the description above with reference to FIGS. 1-9 (and corresponding reference numerals) applies, except where differences are indicated.

Figure 10:
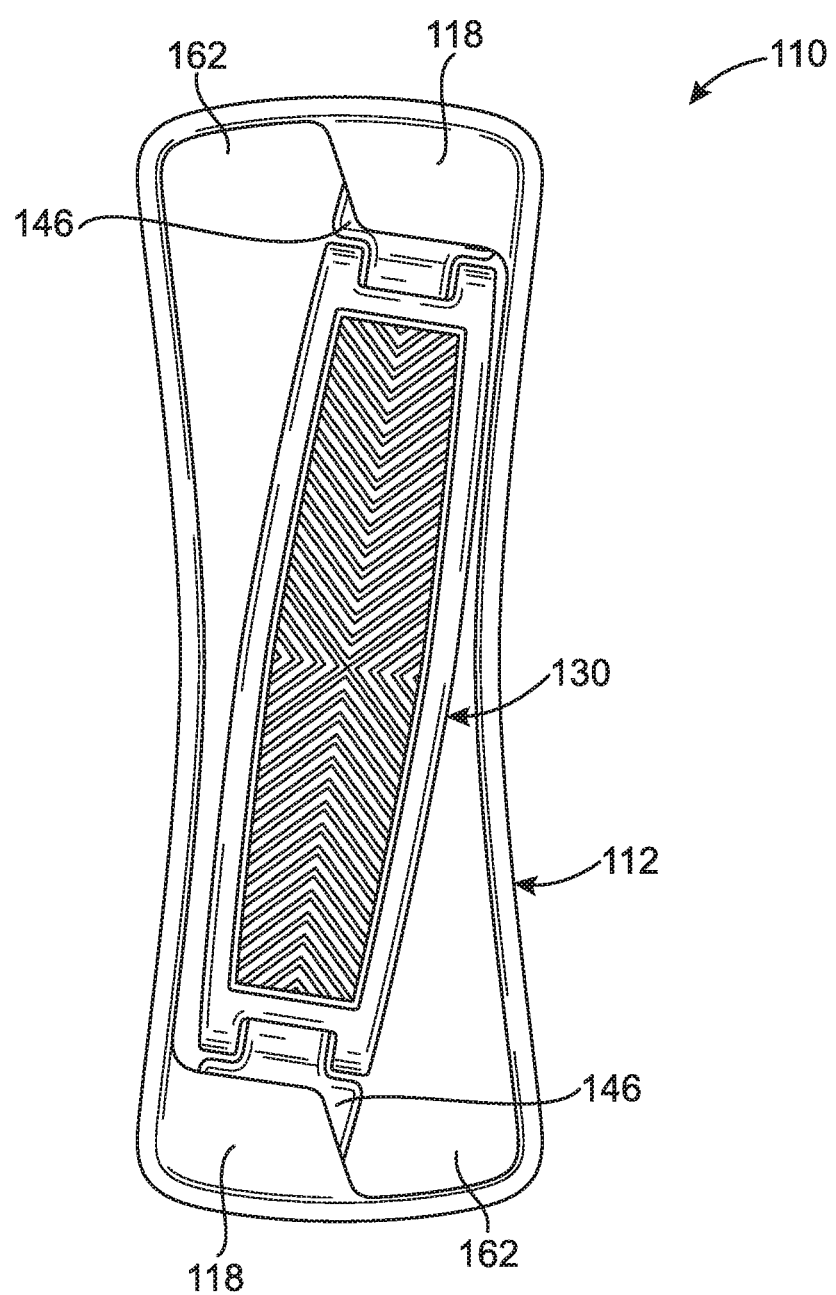
FIG. 10 is a top plan of a second embodiment of a phone grip attachment, illustrating the finger-hold in a collapsed position.
Figure 11:
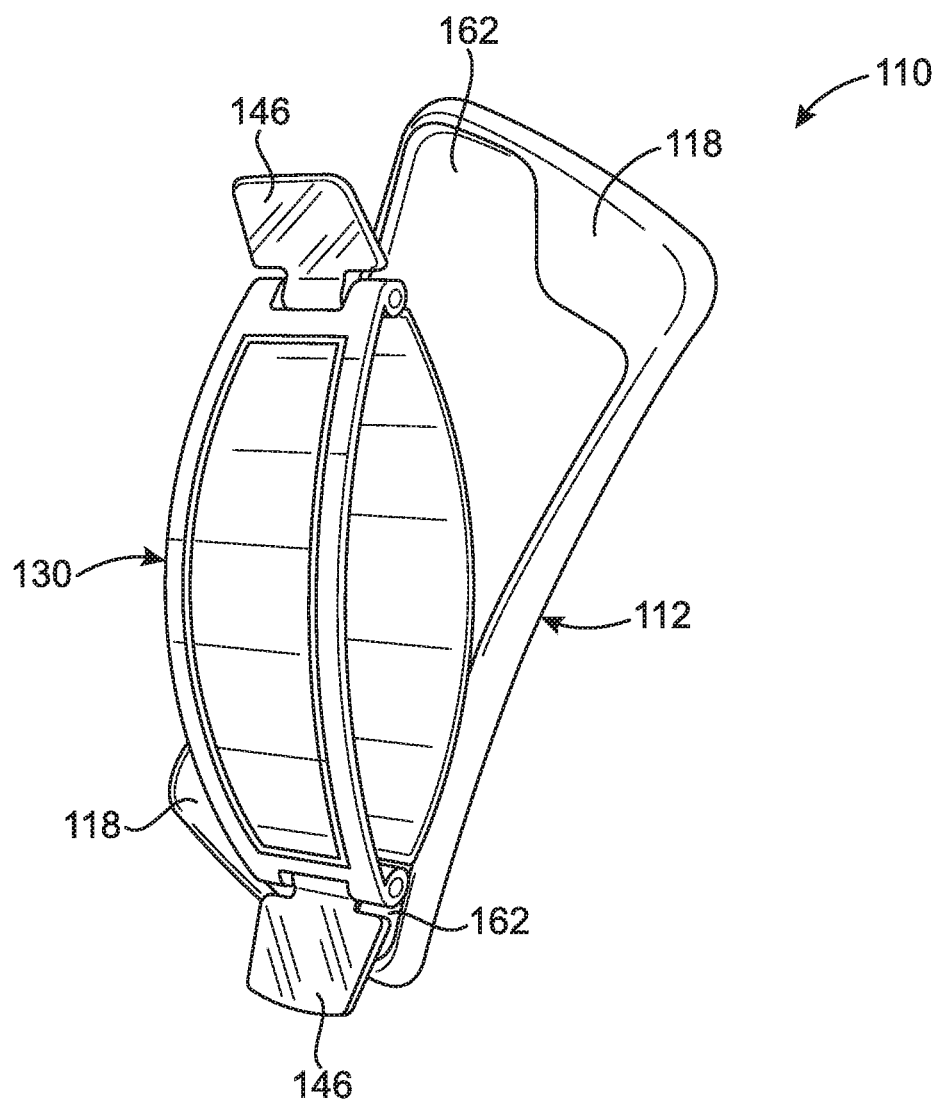
FIG. 11 is a perspective view thereof, illustrating a finger-hold in an extended position.

In FIGS. 10 and 11, the base 112 of attachment 110 includes tab or tab-receiving portions 162. The tab portions 162 have sufficient length and dimensions to receive the tabs 146 of the finger-hold 130 when the finger-hold is in the collapsed (or flattened) position. To collapse the finger-hold, the finger-hold 130 is pressed down to flatten it when the tabs 146 are aligned with the tab portions 162 of the base 112. Once the finger-hold 130 is sufficiently flattened to fit underneath the overhangs of the locking portion 118, the finger-hold is rotated to move the tabs 146 under the respective overhangs, as described above.

Figure 12:
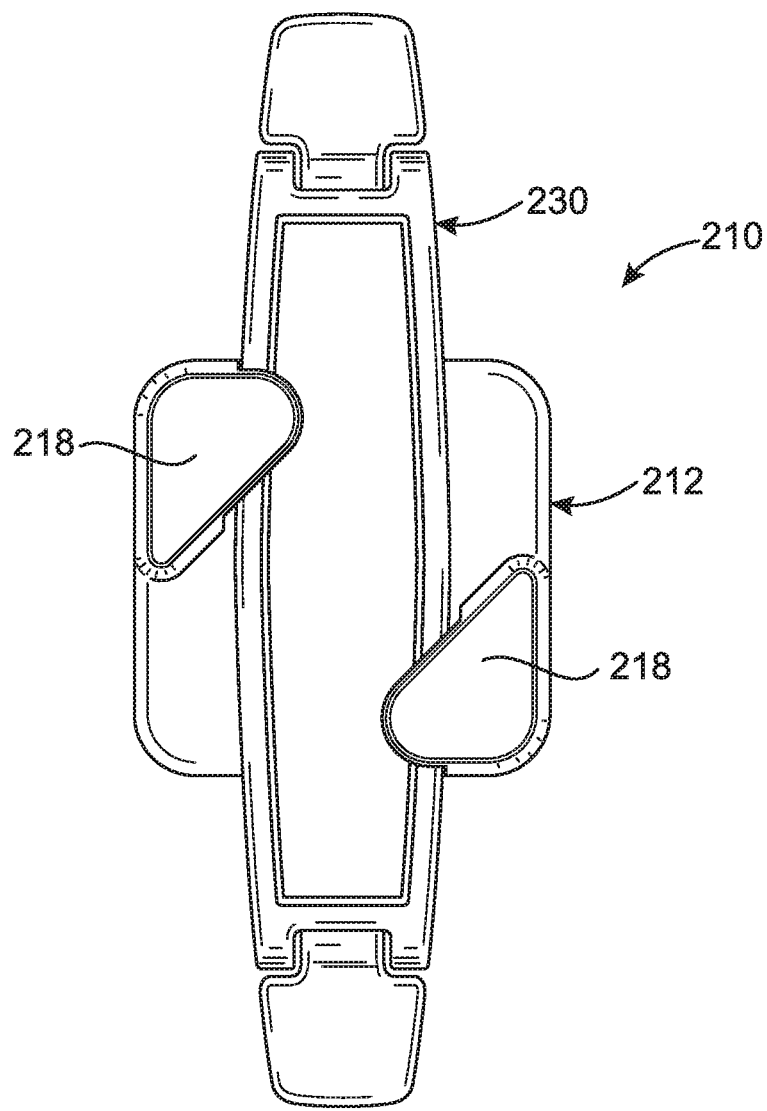
FIG. 12 is a top plan of a third embodiment of a phone grip attachment, illustrating the finger-hold in a collapsed position.
Figure 13:
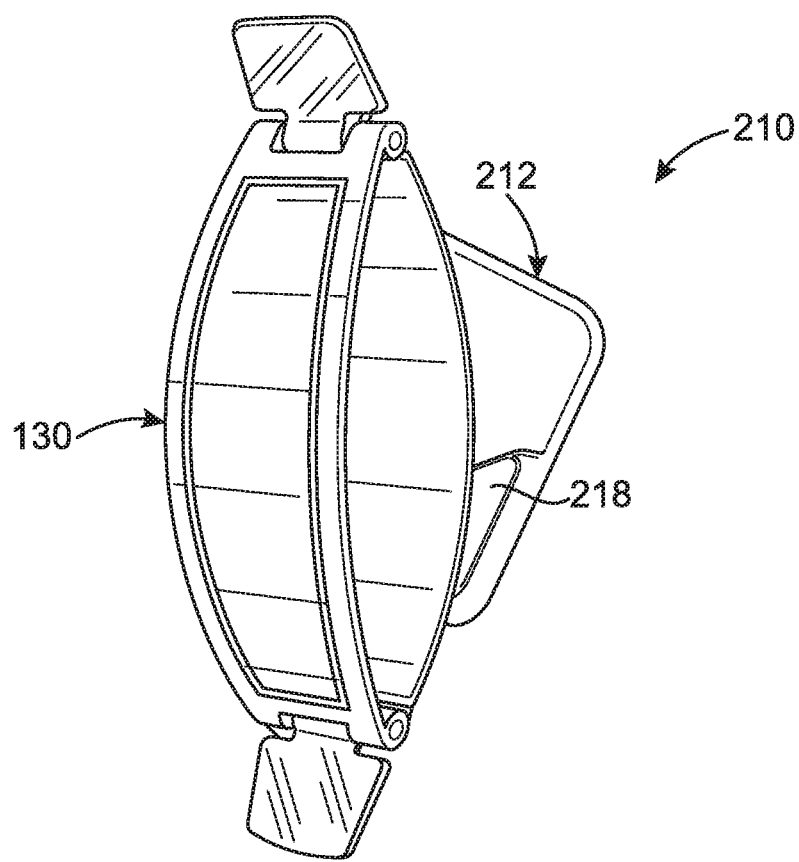
FIG. 13 is a perspective view thereof, illustrating a finger-hold in an extended position.
Figure 14:
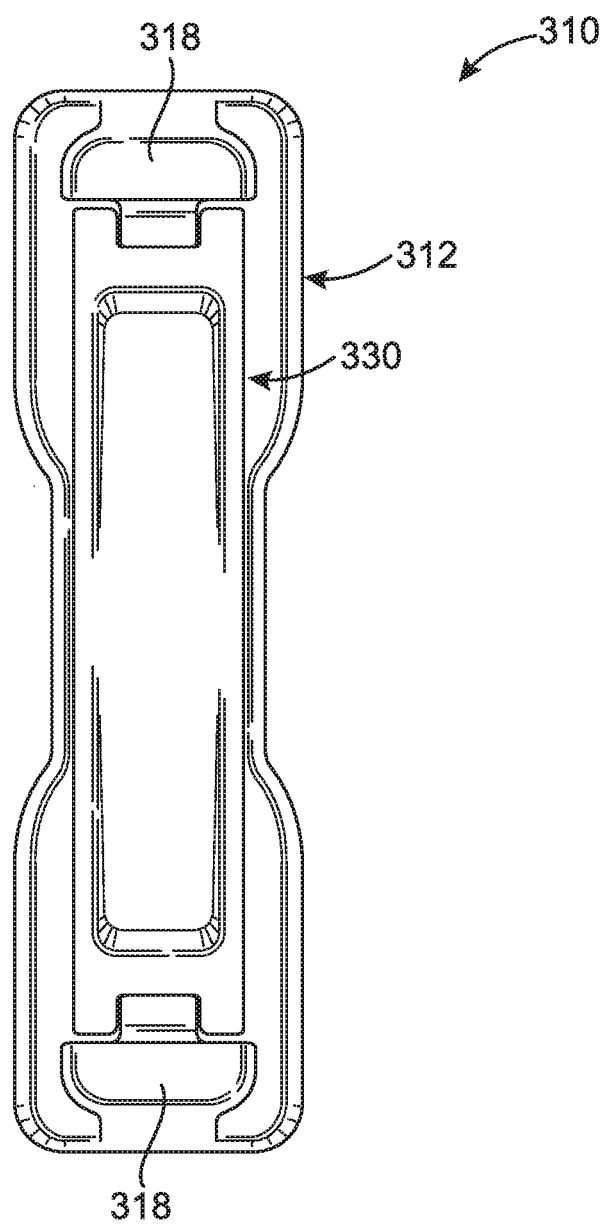
FIG. 14 is a top plan of a fourth embodiment of a phone grip attachment, illustrating the finger-hold in a collapsed position.
Figure 15:
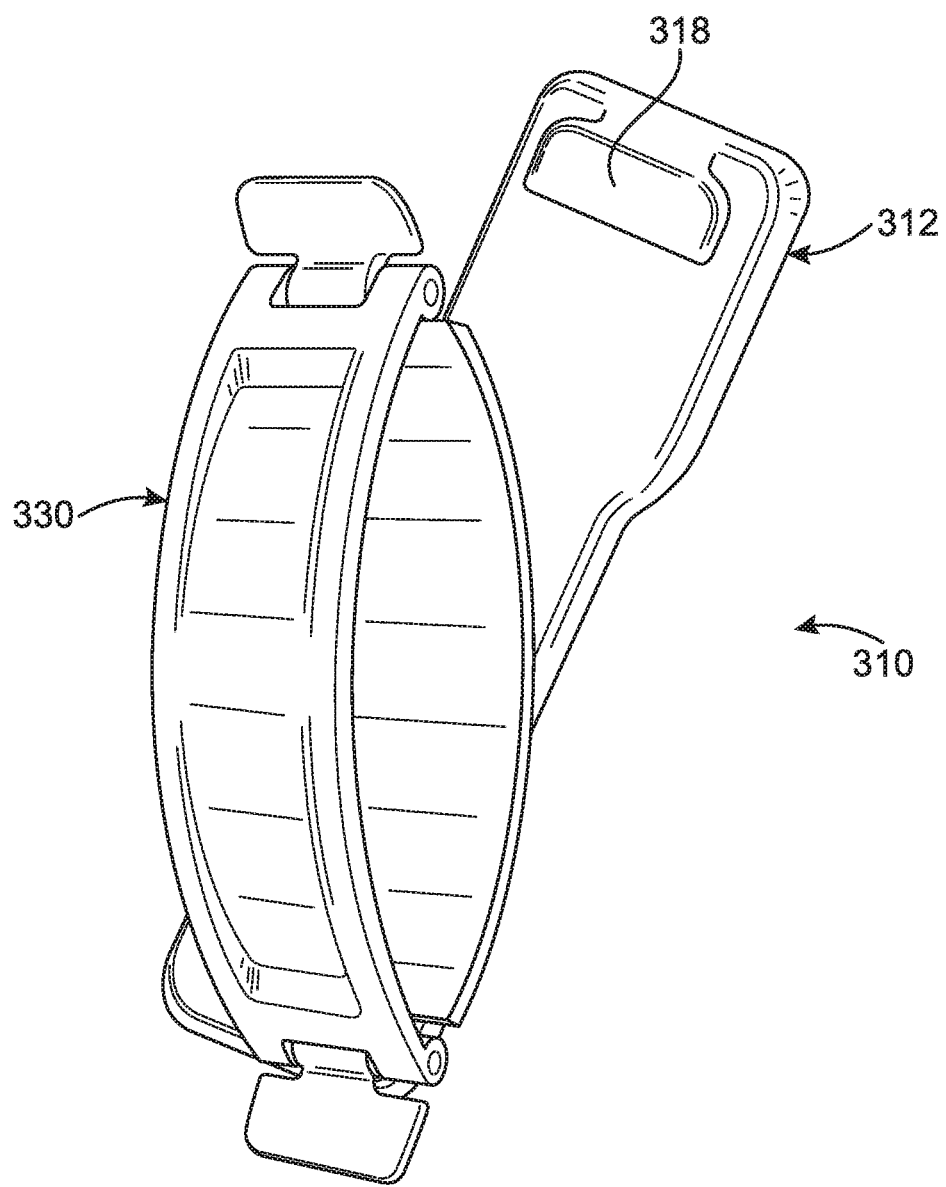
FIG. 15 is a perspective view thereof, illustrating a finger-hold in an extended position.
Figure 16:
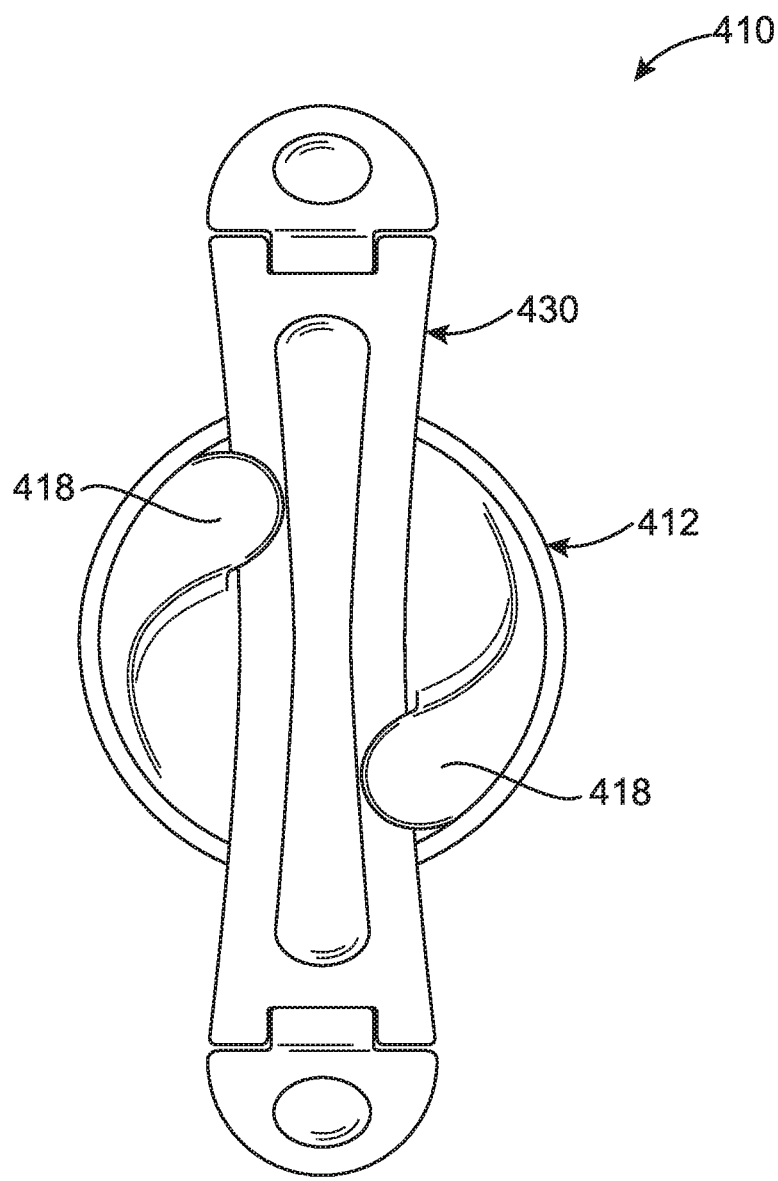
FIG. 16 is a top plan of a fifth embodiment of a phone grip attachment, illustrating the finger-hold in a collapsed position.
Figure 17:
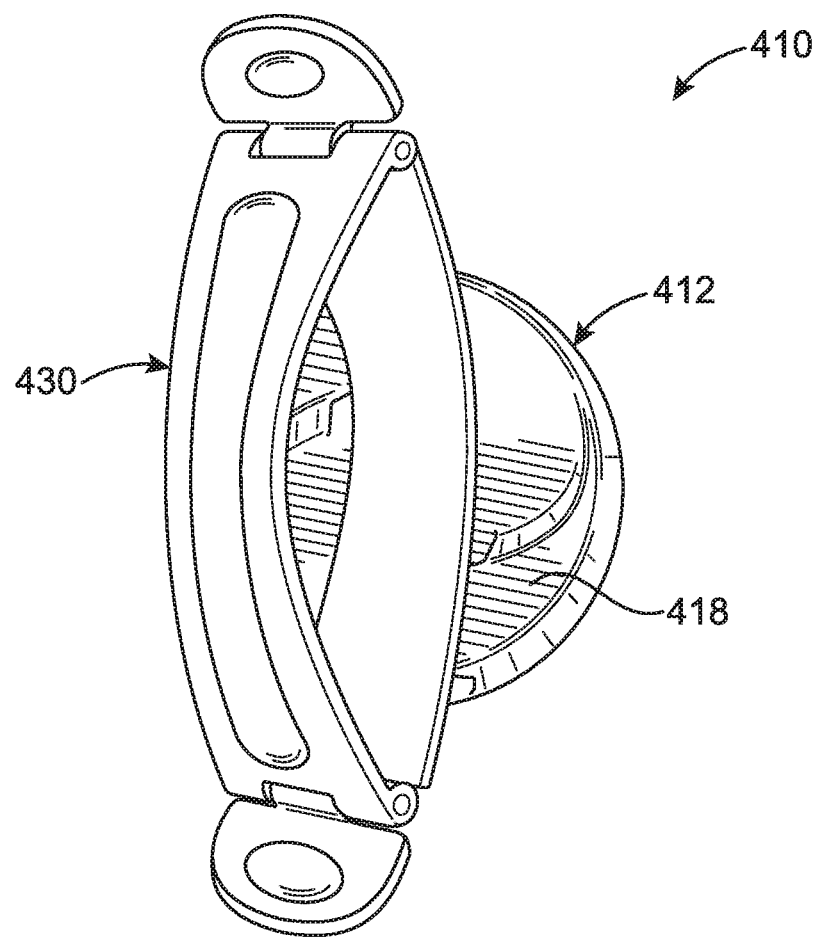
FIG. 17 is a perspective view thereof, illustrating a finger-hold in an extended position.

In the embodiment of FIGS. 12 and 13, the base 212 of the attachment 210 is generally square and is configured and dimensioned such that a central portion of the finger-hold 230 is engaged by the at least one locking portion 218 to retain the finger-hold in the collapsed position. In FIGS. 14 and 15, the at least one locking portion 318 is centrally positioned on the base 312 of the attachment 310. In FIGS. 16 and 17, the base 412 of the attachment 410 is generally round and is configured and dimensioned such that a central portion of the finger-hold 430 is engaged by the at least one locking portion 318. As illustrated in the described embodiments, various configurations are within the scope of the present invention, such as different shapes for the base and/or the finger-hold. Other configurations and embodiments are within the scope of the present invention.

The phone grip attachment as shown and described permits a user to securely attach a phone to the user's hand. Furthermore, the attachment allows a user to orient the phone and the finger-hold in any orientation for comfort and ease of use, while maintaining the thumbs free for use of the phone. Thus, for example, a user can use the finger-hold to secure the phone while taking a selfie, without worrying about dropping the phone. Moreover, the finger-hold collapses substantially flat against the base of the attachment for convenience and a small footprint when the finger-hold is not in use.

It will be understood that various features of the aspects of the apparatus and methods described herein may be used in combination with, or instead of, particular features of another aspect. Having provided the disclosure in detail, it will be apparent that modifications and variations are possible without departing the scope of the disclosure defined in the appended claims. Furthermore, it should be appreciated that all examples in the present disclosure are provided as non-limiting examples.

What is claimed is:

1. A phone grip attachment comprising:
    a base configured for attachment to a phone; and
    a finger-hold attached to the base, the finger-hold having a top member and a bottom member, the finger-hold being movable between an extended position in which an opening is defined between the top member and the bottom member for use in gripping the phone and a collapsed position in which the top member is substantially flat against the bottom member,
    wherein the base includes two locking portions at diagonally opposite locations on the base that are configured to engage a portion of the finger-hold to retain the finger-hold in the collapsed position,
    wherein at least one of the two locking portions comprises at least one overhang defining a gap, the gap below the at least one overhang being configured to receive a portion of the finger-hold to retain the finger-hold in the collapsed position,
    wherein the bottom member of the finger-hold includes at least one tab at an end thereof, the at least one tab being configured to be received in the gap below the at least one overhang to retain the finger-hold in the collapsed position.

2. The phone grip attachment as recited in claim 1, wherein the finger-hold is biased to the extended position.

3. The phone grip attachment as recited in claim 1, wherein the finger-hold is rotatably attached to the base.

4. The phone grip attachment as recited in claim 1, wherein the top member of the finger-hold is pivotally attached to the bottom member of the finger-hold.

5. The phone grip attachment as recited in claim 1, wherein the bottom member includes tabs at each end thereof.

6. The phone grip attachment as recited in claim 1, wherein the at least one tab comprises a lower portion having a first thickness and an upper portion having a second thickness greater than the first thickness, the lower portion configured to be received in the gap and a contoured edge between the upper and lower portions configured to engage a free edge of the locking portion to prevent additional rotation of the finger-hold.

7. The phone grip attachment as recited in claim 1, further comprising foam tape for securing the attachment to the phone.

8. A phone grip attachment comprising:
    a base configured for attachment to a phone, the base including a top surface, a bottom surface, and at least one locking portion, the at least one locking portion comprising an overhang defining a gap between the locking portion and the top surface of the base;
    adhesive positioned on the bottom surface of the base for securing the base to a phone;
    a finger-hold attached to the base, the finger-hold having a top member and a bottom member, the finger-hold being movable between an extended position in which an opening is defined between the top member and the bottom member for use in gripping the phone and a collapsed position in which the top member is substantially flat against the bottom member, wherein the finger-hold is biased to the extended position, wherein the locking portion is configured to engage the finger-hold to retain the finger-hold in the collapsed position,
    wherein the top member of the finger-hold is pivotally attached to the bottom member of the finger-hold,
    wherein the bottom member of the finger-hold comprises a central portion, a first tab at a first end of the bottom member, a first neck between the central portion and the first tab, a second tab at a second end of the bottom member, and a second neck between the central portion and the second tab.

9. The phone grip attachment as recited in claim 8, wherein the finger-hold is rotatably attached to the base.

10. The phone grip attachment as recited in claim 8, wherein the top member comprises a first pair of ears at a first end thereof and a second pair of ears at a second end thereof, wherein the top member is pivotally attached to the bottom member by a first pin extending through the first pair of ears and the first neck and a second pin extending through the second pair of ears and the second neck.

11. A method comprising:
    providing a phone grip attachment comprising:
        a base configured for attachment to a phone, the base including a top surface, a bottom surface, and at least one locking portion, the at least one locking portion comprising an overhang defining a gap between the locking portion and the top surface of the base;
        adhesive positioned on the bottom surface of the base for securing the base to a phone;
        a finger-hold attached to the base, the finger-hold having a top member and a bottom member, the finger-hold being movable between an extended position in which an opening is defined between the top member and the bottom member for use in gripping the phone and a collapsed position in which the top member is substantially flat against the bottom member, wherein the finger-hold is biased to the extended position, wherein the locking portion is configured to engage the finger-hold to retain the finger-hold in the collapsed position;

securing the phone grip attachment to the phone using the adhesive; and collapsing the finger-hold from the extended position to the collapsed position by pressing the top member substantially flat against the bottom member and rotating the finger-hold until at least one tab of the finger-hold is positioned in the gap defined by the overhang.

12. The method of claim 11, further comprising extending the finger-hold from the collapsed position to the extended position by rotating the finger-hold until the at least one tab of the finger-hold is free from the at least one overhang.

13. The method of claim 11, wherein the finger-hold is rotatable attached to the base.

14. The method of claim 11, wherein the top member of the finger-hold is pivotally attached to the bottom member of the finger-hold.

15. The method of claim 11, wherein the bottom member includes tabs at each end thereof.

16. The method of claim 11, wherein the bottom member of the finger-hold includes at least one tab at an end thereof, the at least one tab being configured to be received in the gap below the overhang to retain the finger-hold in the collapsed position.

17. The method of claim 11, wherein the at least one tab comprises a lower portion having a first thickness and an upper portion having a second thickness greater than the first thickness, the lower portion configured to be received in the gap and a contoured edge between the upper and lower portions configured to engage a free edge of the locking portion to prevent additional rotation of the finger-hold.

18. The method of claim 11, wherein the phone grip attachment further comprises foam tape for securing the attachment to the phone.

19. The method of claim 11, wherein the top member comprises a first pair of ears at a first end thereof and a second pair of ears at a second end thereof, wherein the top member is pivotally attached to the bottom member by a first pin extending through the first pair of ears and the first neck and a second pin extending through the second pair of ears and the second neck.

20. The method of claim 11, wherein the bottom member of the finger-hold comprises a central portion, a first tab at a first end of the bottom member, a first neck between the central portion and the first tab, a second tab at a second end of the bottom member, and a second neck between the central portion and the second tab.

* * * * *